United States Patent [19]
Lee et al.

[11] Patent Number: 6,088,782
[45] Date of Patent: *Jul. 11, 2000

[54] METHOD AND APPARATUS FOR MOVING DATA IN A PARALLEL PROCESSOR USING SOURCE AND DESTINATION VECTOR REGISTERS

[75] Inventors: De-Lei Lee; L. Rodney Goke; William Carroll Anderson, all of Austin, Tex.

[73] Assignee: Motorola Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/891,228

[22] Filed: Jul. 10, 1997

[51] Int. Cl.[7] .................................................. G06F 15/00
[52] U.S. Cl. ............................................................ 712/4
[58] Field of Search .................... 395/800.03, 800.04, 395/800.05, 800.02; 712/2, 3, 4, 5

[56] References Cited

U.S. PATENT DOCUMENTS

| | | | |
|---|---|---|---|
| 5,197,130 | 3/1993 | Chen et al. | 395/800.03 |
| 5,226,171 | 7/1993 | Hall et al. | 395/800.09 |
| 5,262,974 | 11/1993 | Hausman et al. | 364/746.2 |
| 5,430,884 | 7/1995 | Beard et al. | 395/800.03 |
| 5,544,337 | 8/1996 | Beard et al. | 395/800.04 |

OTHER PUBLICATIONS

Howe's Free On–line Dictionary of Computing (http://www.instantweb.com/~foldoc/), mnemonic, instruction mnemonic, op code, modulo, Feb. 1997.

A scalar architecture for pseudo vector processing based on slide–windowed registers; Hiroshi Nakamura, Taisuke Boku, Hideo Wada, Hiromitsu Imori, Ikuo Nakata, Yasuhiro Inagami, Kisaburo Nakazawa, and Yoshiyuki Yamashita; Supercomputing; http://www.acm.org, 1993.

Chen, et al., "Introduction to Computer Architecture", Science Research Associates, Inc., pp. 326–355 (1975).

*Primary Examiner*—Richard L. Ellis
*Attorney, Agent, or Firm*—J. Gustav Larson; Jeffrey G. Toler

[57] ABSTRACT

A Single Instruction Multiple Data processor apparatus for implementing algorithms using sliding window type data is shown. The implementation shifts the elements of a Destination Vector Register (406, 606) either automatically every time the destination register value is read or in response to a specific instruction (800). The shifting of the Destination Vector Register (406, 606) allows each processing element to operate on new data. As the destination vector (406, 606) elements are shifted, a new element is provided to the vector from a Source Vector Register (404, 604).

33 Claims, 6 Drawing Sheets

METHOD AND APPARATUS FOR MOVING DATA IN A PARALLEL PROCESSOR USING SOURCE AND DESTINATION VECTOR REGISTERS

FIELD OF THE INVENTION

This invention relates in general to vector processing devices, and specifically to data throughput in a single instruction multiple data stream architecture (SIMD) vector processor.

BACKGROUND OF THE INVENTION

A number of commonly used digital signal processing (DSP) algorithms, including finite impulse response (FIR) filters, correlation, autocorrelation, and convolution, are computationally similar and may be characterized as "sliding window" algorithms. These algorithms are referred to as "sliding window" algorithms because of the manner in which they access data. The basic data movement pattern of a "sliding window" algorithm is illustrated in FIG. 1. In FIG. 1, a long vector of data 102 needs to be processed by a sliding window algorithm.

However, each step of the algorithm uses only a subvector, or "window", 104 of the full vector 102. The window 104 "slides" across the vector 102 as the algorithm progresses, shifting one place for each algorithm step. For example, in FIG. 1, the window 104 slides in an upward direction across the vector 102.

A good example of a sliding window algorithm is a FIR filter characterized by the following equation.

$$y[n] = \sum_{i=0}^{T} a[i] * x[n-i] \quad (n = 0, 1, \ldots, N)$$

The algorithm may be divided into steps, where each step processes a "window" of the input vector, x, and where each window is shifted one position relative to the window of the previous step. For example, each value of index i in the summation above might correspond to one step, and the N+1 values of x[n-i] used during each step would constitute the window as follows:

| step | window |
|---|---|
| i = 0 | x[0], x[1], ..., x[N] |
| i = 1 | x[-1], x[0], ..., x[N-1] |
| i = 2 | x[-2], x[-1], ..., x[N-2] |
| i = 3 | x[-3], x[-2], ..., x[N-3] |
| ... | |
| ... | |
| ... | |
| I = T | x[-T], x[1-T], ..., x[N-T] |

Algorithms of this type are widely used in digital signal processing, image processing, pattern recognition, and other applications. Consequently, for applications of this type, a SIMD vector processor needs an efficient mechanism for handling "sliding window" algorithms.

One prior art approach to efficiently handling these algorithms has been to avoid the "sliding window" problem by avoiding PE-to-PE data movement during computation by replicating the data within the Vector Data Memory (VDM) such that every PE has all the data it needs in its own slice of VDM. Once the required data is arranged properly in VDM, this method allows multiply-and-accumulate (MAC) oriented computation to proceed rapidly. A principal drawback of this method is that VDM space is wasted since data is replicated for multiple PEs. For example, a machine with PEs might require copies of the same data within the VDM in order to give each PE its own readily accessible copy. Another drawback of this implementation is that significant execution time and vector addressing may be required to initially replicate the data before MAC oriented computation begins.

Additionally, many of the prior art SIMD machines have had some mechanism for moving data among PEs. For example, some machines have supported basic "nearest neighbor" communication among PEs, allowing data to be rotated or shifted among PEs. Others have used more complex interconnection networks, such as a shuffle exchange network, to handle more complex data movement patterns. In either case, the typical prior art PE-to-PE communication mechanism permutes the components of a vector whose length equals the number of PEs. A disadvantage of the data movement mechanisms in these prior art architectures is that, for each step of a "sliding window" algorithm, multiple data movement operations may be required to move data to the proper PE locations. Consequently, these data movement operations can consume a large portion of execution time, resulting in inefficient utilization of MAC hardware and reduced overall system performance.

Therefore, a method of providing data to PEs in a timely and memory efficient manner would be desirable.

BRIEF DESCRIPTION OF THE DRAWINGS

The present invention is illustrated by way of example and is not limited in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures are exaggerated relative to other elements to help to improve understanding of embodiment(s) of the present invention.

DETAILED DESCRIPTION

The present invention provides an efficient way to implement algorithms using sliding window type data access on a parallel processing system. The implementation shifts the elements of a Destination Vector Register either automatically every time the destination register value is read or in response to a specific instruction. The shifting of the Destination Vector Register allows each PE to operate on new data. As the destination vector elements are shifted, a new element is provided to the Destination Vector Register from a Source Vector Register.

Figure 2:
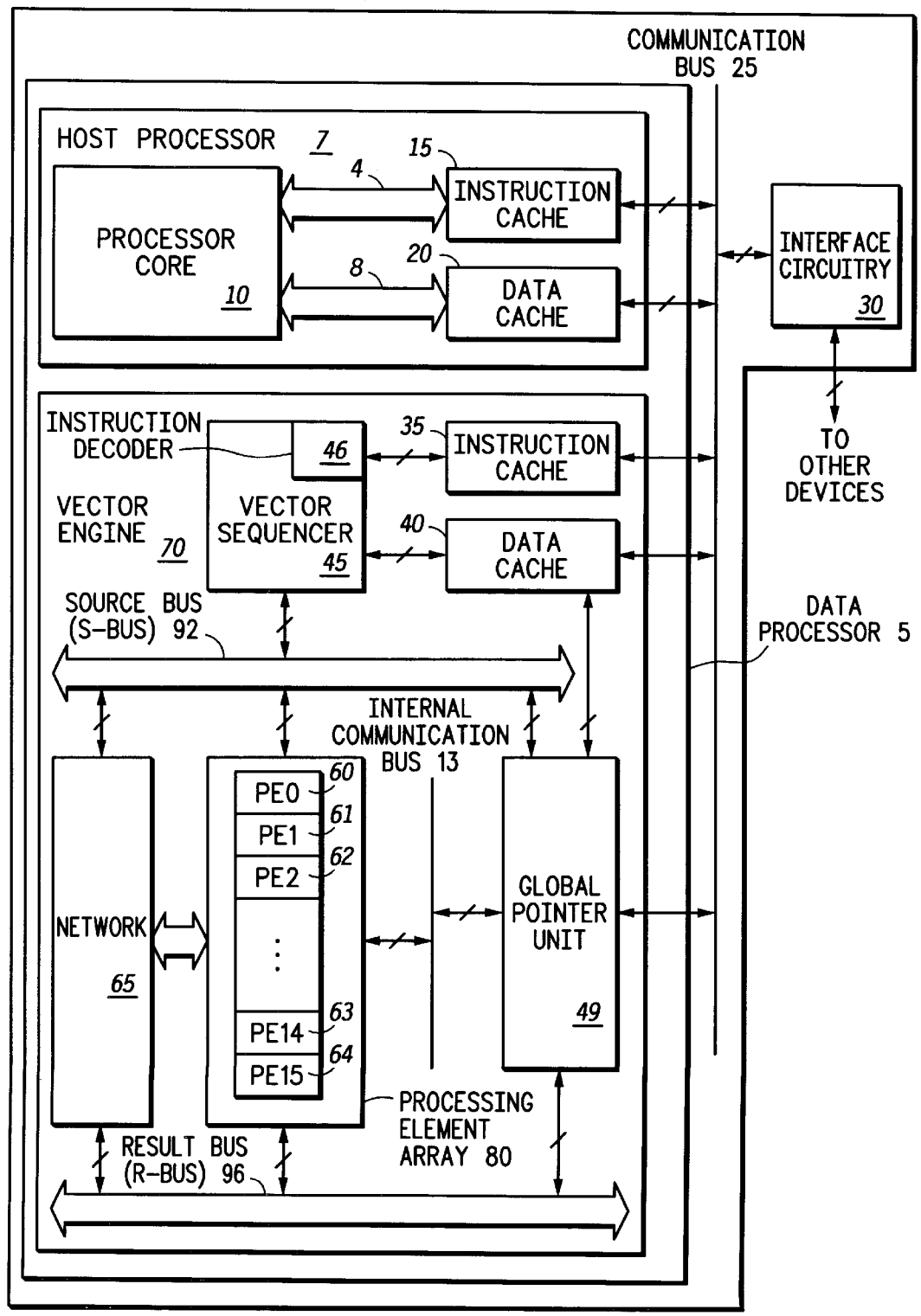
FIG. 2 illustrates a system level block diagram of a vector processor.

FIG. 2, illustrates one parallel processing system 3 including a parallel data processor 5 having host processor 7 and vector engine 70, and interface circuitry 30. Host processor 7 consists of a processor core 10, coupled to instruction cache 15 by bus 4 and coupled to data cache 20 by bus 8. Instruction cache 15, data cache 20, and interface circuitry 30 are each coupled to communication bus 25 by way of bi-directional multiple conductors. Communication bus 25 allows communication between host processor 7, interface circuitry 30, and vector engine 70. In alternate embodiments, interface circuitry 30 is any type of circuitry which allows communication between data processor 5 and other devices.

Referring to FIG. 2, in one embodiment of the present invention, data movement and operations within vector engine 70 are controlled by vector sequencer 45, which is bi-directionally coupled by multiple conductors to instruction cache 35 and to data cache 40. Instruction cache 35 and data cache 40 are each coupled to communication bus 25 by way of bi-directional multiple conductors. Note that other embodiments allow uni-directional, bi-directional or a combination for conductors among instruction cache 35, data cache 40, vector sequencer 45, and communication bus 25. Vector engine 70 communicates with other modules in parallel processing system 3 via communication bus 25, and further with other devices by way of interface circuitry 30. Flexibility allows vector engine 70 to function as an autonomous module within parallel processing system 3.

As illustrated in FIG. 2, vector engine 70 consists of vector sequencer 45, network 65, processing element array 80 and global pointer unit 49. All three communicate through two busses, namely a source bus (S-bus) 92 and a result bus (R-bus) 96. Vector sequencer 45, network 65, processing element array 80, and global pointer unit 49 are each coupled to S-bus 92 by way of bi-directional multiple conductors. Additionally, network 65, processing element array 80, and global pointer unit 49 are each coupled to R-bus 96 by way of bi-directional multiple conductors. In one embodiment, global pointer unit 49 is a global data path unit. Vector sequencer 45 controls data movement and operations within vector engine 70 by providing signals to network 65, processing element array 80, and global pointer unit 49. In one embodiment vector sequencer 45 receives status signals from within vector engine 70 and affects control decisions accordingly. Instruction cache 35 and data cache 40 are local within vector engine 70 and each communicate through communication bus 25 by way of bi-directional multiple conductors.

Further, referring to FIG. 2, internal communication bus 13 couples processing element array 80 and global pointer unit 49. Network 65 is directly coupled to processing element array 80. In one embodiment of the present invention, processing element array 80 is composed of sixteen processing elements PE(0) 60, PE(1) 61, PE(2) 62 through PE(14) 63, and PE(15) 64. Global pointer unit 49 communicates with data cache 40 by way of bi-directional conductors.

Figure 1:
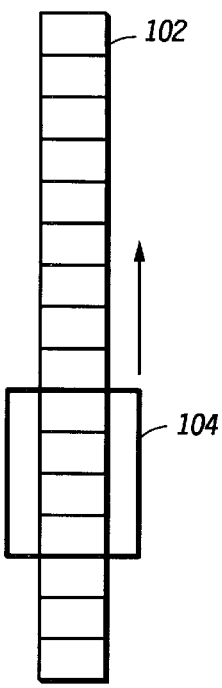
FIG. 1 illustrates an example of a "sliding window" associated with a data vector.
Figure 3:
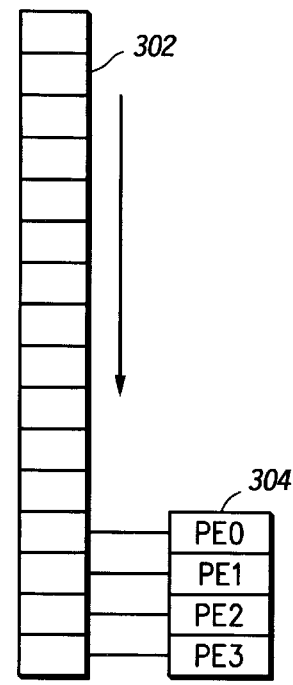
FIG. 3 illustrates a block diagram of processing elements and a vector in accordance with the present invention.

FIG. 3 illustrates, in accordance with the present invention, an efficient mechanism for providing vector register data to a SIMD device for use with a sliding window type algorithm. FIG. 3 illustrates a vector register 302 that has more elements than there are PEs 304. As illustrated, each PE is associated with a specific vector element. The values of the vector register 302 are shifted downward to provide each of the PEs the value of an adjacent element. This shifting in effect accomplishes a sliding window data access for each of the PEs 304. This is an improvement over the prior art, in that a single copy of the vector data is maintained, and that the appropriate vector data is directly accessible to each PE, utilizing only one downward shift operation per algorithm step, instead of multiple data transfer operations per step.

Figure 4:
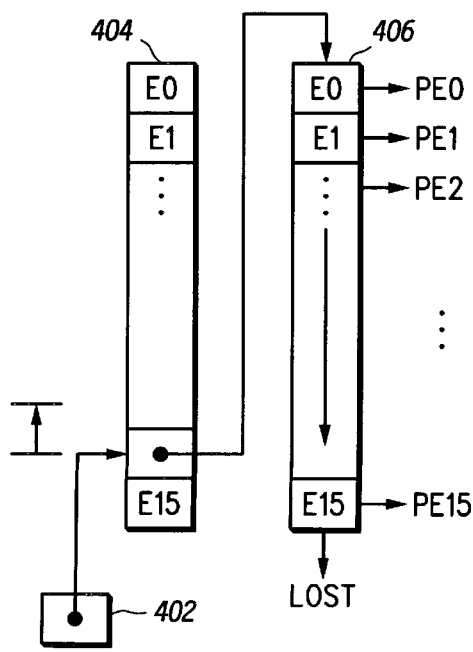
FIG. 4 illustrates a block diagram of one embodiment of the vector of FIG. 3 having a Source Vector Register and a Destination Vector Register.

FIG. 4 illustrates a specific embodiment of the present invention including a pointer 402, a Source Vector Register (SVR) 404, and a Destination Vector Register (DVR) 406. The pointer 402 is connected to the SVR 404 for uniquely identifying an element of the SVR 404. The SVR 404 is connected to the DVR 406 for providing the value stored in the element indicated by the pointer 402 to a first element of the DVR 406. At least a portion of the elements of the DVR 406 are connected to corresponding PEs (Not shown in FIG. 4). Note that the first element of the DVR 406 may be any element associated with the DVR 406.

The data stored within each element of the DVR 406 is capable of being shifted to the next element of the DVR 406 based upon either specific instructions or register settings. As illustrated, the DVR 406 data is shifted in a downward direction through each of sixteen elements (E0–E15). The data is lost once shifted "out" of the register. Note that in another embodiment, the output can wrap around such that the data from E15 is shifted to element E0, or could be routed to a storage element for further use. This shifting allows each PE access to the data needed to perform the sliding window algorithm. Note that yet another embodiment would allow the shift direction to be controlled by the instruction or register settings.

As data shifts, it is necessary for new data to be introduced into the DVR 406. This is accomplished by copying the data value pointed to by the pointer 402 into the first element E0 of the DVR 406. The pointer may then be updated such that it points to a new value or may remain the same. Generally, the pointer will be either incremented or decrement by a fixed amount to provide the next Source Vector Register element's value to the Destination Vector Register.

Therefore, the pointer 402 includes a data storage portion, or memory, having enough bits to uniquely identify one of the elements of the SVR 404. For example, where there are sixteen elements in SVR 404, the pointer must have at least four bits.

Figure 5:
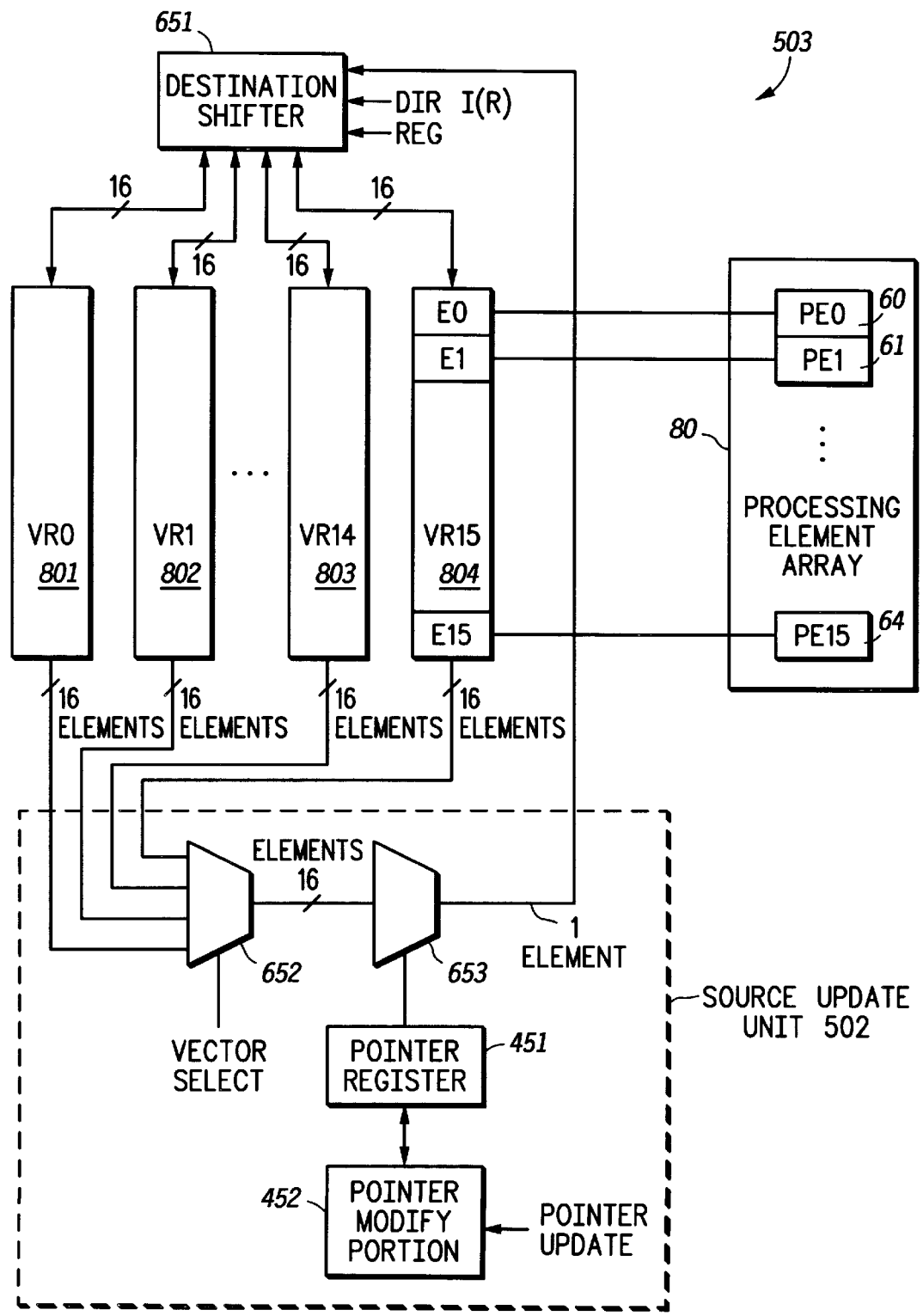
FIG. 5 illustrates a block and logic diagram of a specific implementation of the vector and processing elements of FIG. 3 and FIG. 4.

FIG. 5 illustrates a block view of key components 503 of a parallel processing system implementing the registers of FIG. 4. The components 503 include a Processing Element Array 80, vector registers VR0 801 though VR15 804, Destination Shifter 651, and Source Update Unit 502.

The Processing Element Array 80 is coupled to each of the vector registers such that the array 80 can receive data from any selected register. In FIG. 5, only the connection between the processing element array and VR15 is illustrated. Each vector register is connected to the Destination Shifter 651. The Destination Shifter 651 is for shifting the elements of the vector register that is selected as the Destination Vector Register. Each array is connected to the Source Update Unit 502. The Source Update Unit 502 is for updating the pointer following insertion of the selected source vector element data into the Destination Vector Register. The Source Update Unit 502 is connected to the Destination Shifter 651 so that the value pointed to can be properly inserted into the Destination Vector Register 406 during the shift process.

The Source Update Unit 502 of FIG. 5 illustrates a specific implementation for updating a pointer. The unit 502 comprises a Vector Multiplexer 652, an Element Multiplexer 653, a Pointer Register 451, and a Pointer Modify Portion 452. The Pointer Register 451 can consist of any data storage element capable of uniquely identifying any one element with in a vector register. The pointer is modified by the Pointer Modify Portion 452 which receives a POINTER UPDATE signal. The POINTER UPDATE signal specifies whether the pointer is incremented, decrement, or left unchanged and can be specified by an instruction, specified by a register (not illustrated), or fixed by design. For example, in one embodiment, the POINTER UPDATE signal is fixed such that the Pointer 451 is always decremented. In addition, the POINTER UPDATE signal can be generated by specific instructions or register values. The Source Update Unit 502 can be such that the source register is shifted only in response to an instruction, or it can be set up to modify the pointer whenever an access, such as a read, occurs in the vector register being accessed. The automatic update scenario could be used when it would save instructions or processing clock cycles, thereby gaining efficiency.

The Pointer 451 is connected to the Element Multiplexer 653 for selecting one of 16 elements associated with a vector register to be provided to the shifter 651 for insertion into the destination register. The selected vector register data is provided to the Element Multiplexer 653 from the Vector Multiplexer 652 which receives a VECTOR SELECT signal. The VECTOR SELECT signal can be provided by an instruction, register, or may be implicit. In one embodiment, the VECTOR SELECT signal is provided from the instruction decoder 46 of FIG. 2 to allow for system flexibility. The Vector Multiplexer 652 is connected to each vector register 801 through 804. When selected, each element of the selected vector is provided to the Element Multiplexer 653. Additionally, the POINTER UPDATE signal can indicate a pointer update step value for indicating an increment value, or a step value, specifying how much to modify the pointer. The pointer update step value may be specified by an instruction or a stored register value, or it may be implicit to the system specification.

Figure 6:
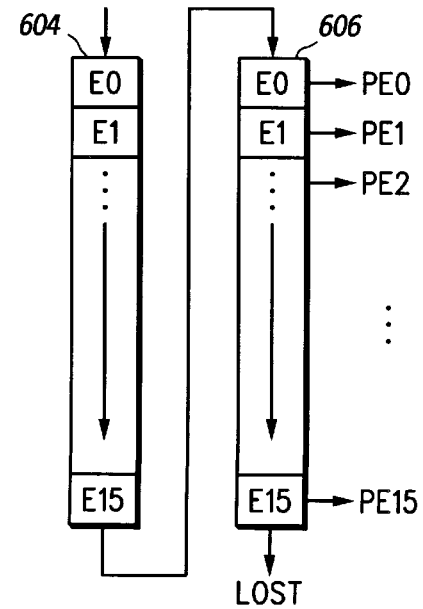
FIG. 6 illustrates a block diagram of a second embodiment of the vector of FIG. 3 having a Source Vector Register and a Destination Vector Register.

FIG. 6 illustrates another embodiment of the present invention. In this embodiment, a last element, E15, of Source Vector Register 604 is connected to the first element, E0, of Destination Vector Register 606, such that the value in the last element of the Source Vector Register 604 can be shifted into the first element of the Destination Vector Register 606.

Figure 7:
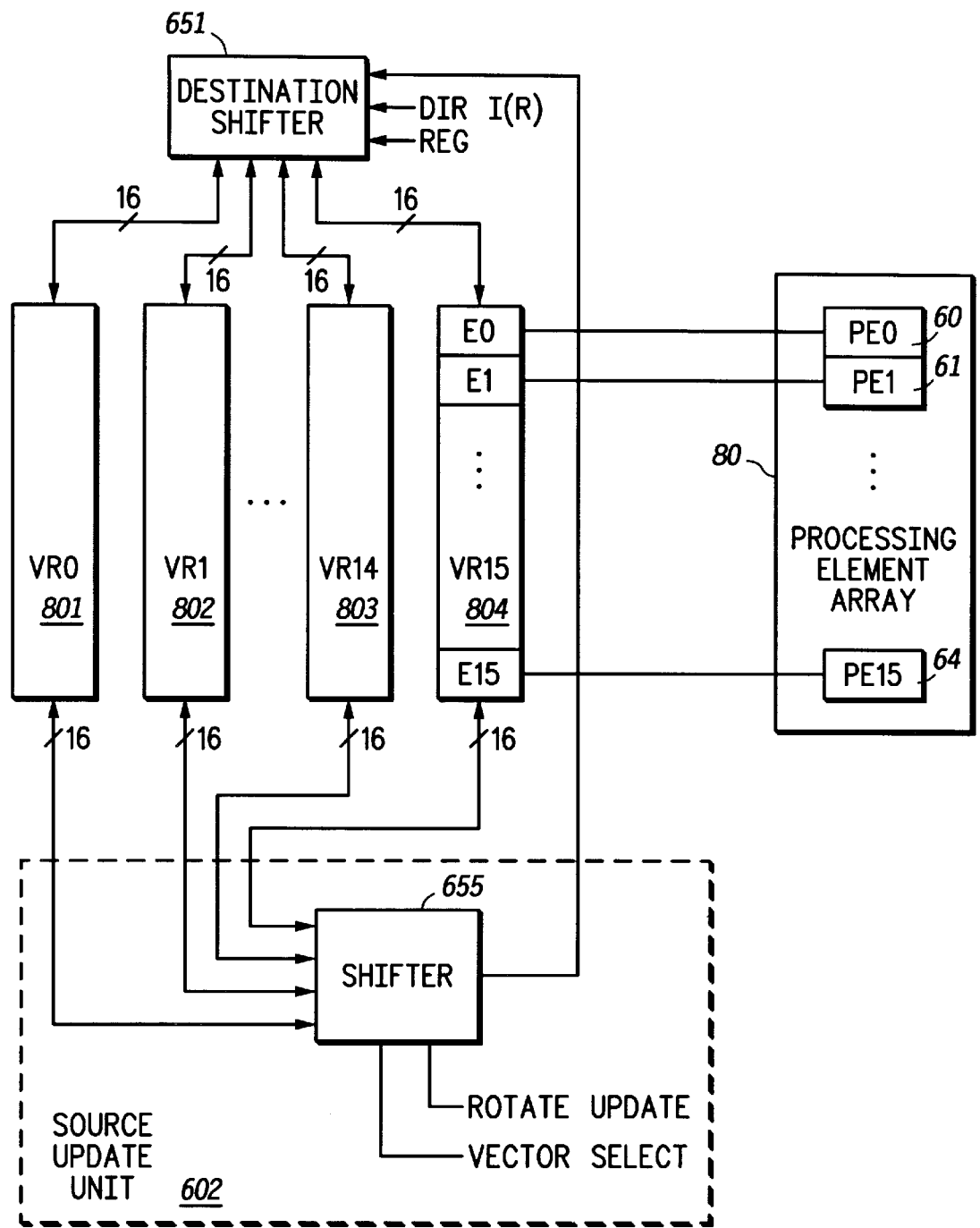
FIG. 7 illustrates a block and logic diagram of a specific implementation of the vector and processing elements of FIG. 3 and FIG. 6.

FIG. 7 illustrates an implementation of embodiment of FIG. 6. FIG. 7 is substantially similar to FIG. 5, except for the Source Update Unit 602. The Source Update Unit 602 of FIG. 7 includes a shifter 655, for shifting one of the Vector Registers 801–804, and provides a specific element value to the destination shifter 651 for insertion into the Destination Vector Register 606. The Shifter 655 receives a ROTATE UPDATE signal and a VECTOR SELECT signal. The VECTOR SELECT signal is the same as the VECTOR SELECT signal previously discussed with reference to FIG. 5 and will not be discussed further. The ROTATE UPDATE signal is analogous to the POINTER UPDATE signal of FIG. 5, in that it specifies whether to rotate upwards, rotate downwards, or leave the selected Source Vector Register unmodified. In addition, the ROTATE UPDATE signal can indicate a rotation step value for indicating how far to rotate the elements within the selected Source Vector Register 604 each time.

Figure 8:
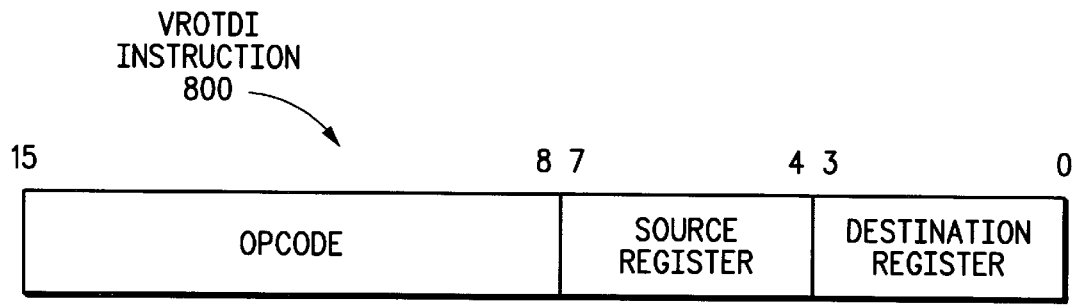
FIG. 8 illustrates in a block form components of an instruction for implementing the present invention.

FIG. 8 illustrates the bit fields for an instruction for use with one embodiment of the present invention. A Vector ROTate Downward and Insert (VROTDI or vrotdi) instruction can be used to explicitly cause an update of the indicated source and destination registers.

Mnemonics for such an instruction could include VROTDI <SVector> <DVector> for downward rotation of the destination register, where Svector designates the Source Vector Register and Dvector designates the Destination Vector Register. In FIG. 8, the instruction bitfield has been predetermined to have the first four bits (from least significant bit to most significant bit as indicated in FIG. 8) identify the Destination Vector Register, while the second four bits identify the Source Vector Register. The eight most significant bits represent the instruction opcode.

Figure 9:
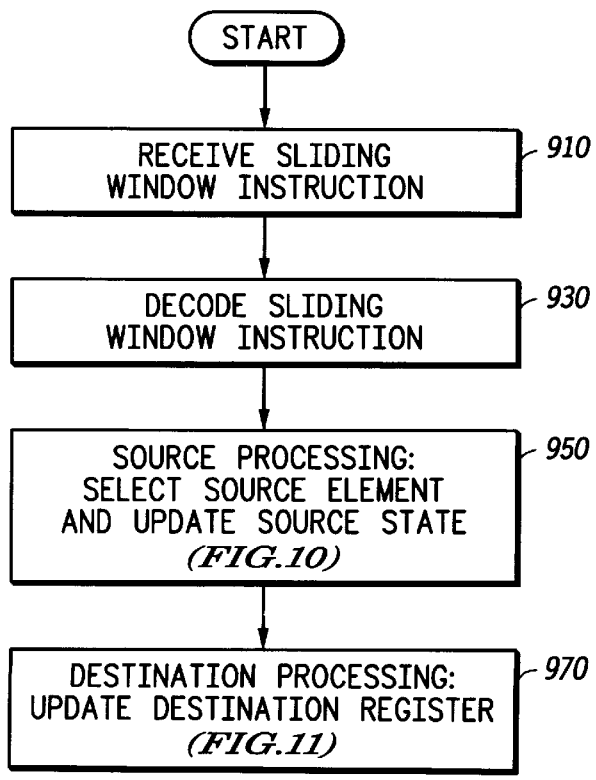
FIG. 9 illustrates a flow diagram of a method in accordance with the present invention.

FIG. 9 shows a method in accordance with the present invention. At step 910 a sliding window type instruction is received. Next, the received instruction is decoded at step 930. Next, at step 950, source processing occurs. The source processing would include identifying a Source Vector Register, selecting a source element from the Source Vector Register, and updating a source state. Next, at step 970, the Destination Vector Register is updated, using the source element selected in step 950. The steps 950 and 970 are discussed in more detail in subsequent figures.

Figure 10:
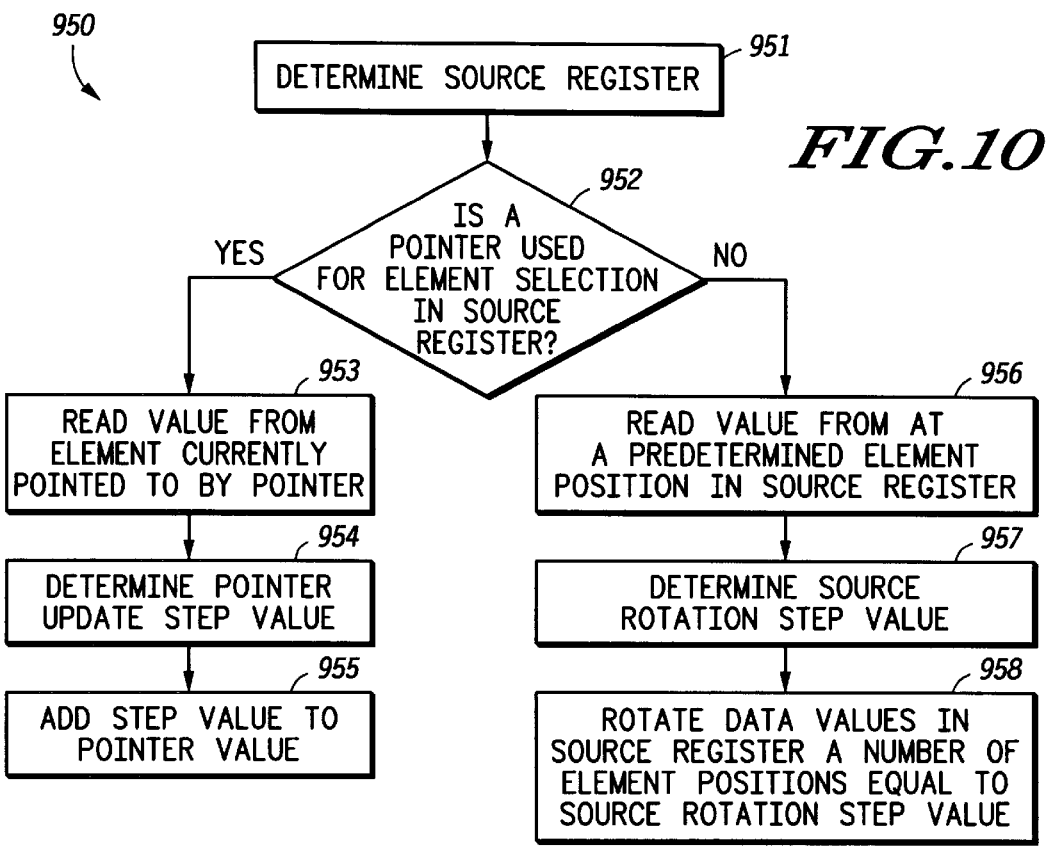
FIG. 10 illustrates an expanded flow of step 950 of FIG. 9.

FIG. 10 illustrates a more detailed view of the step 950 of FIG. 9. At step 951 the Source Vector Register is determined. In a preferred embodiment, the Source Vector Register will be specified by a field of the instruction. However, in other embodiments the source and destination registers can be specified in a register, or may be fixed by design specification. Next, at step 952, a determination is made whether a pointer is used to identify the source element in the source register for insertion into the destination register. If a pointer is used, the flow proceeds to step 953. If a pointer is not used, the flow proceeds to step 956. It would be understood to one skilled in the art that generally, any one implementation of the present invention will have the determination of step 952 built in such that one path or the other will automatically occur.

At step 956, when no pointer is used, a source element value is read from a predetermined element of the source register. Next, at step 957, a source rotation step value is determined. The source rotation step value specifies how far and in what direction the source register is to be rotated. Data within the source register can be rotated among vector element positions in either direction by a specified number of positions, or the source register can be left unchanged to access the same element again. Next, at step 958, data values are rotated within the source register, based upon the source rotation step value.

At step 953, which assumes a pointer is used, a source element value is read from the source register element currently pointed to by the pointer. Next, at step 954, a pointer update step value is determined. The pointer update step value specifies how far and in what direction the pointer should be adjusted. The pointer can be incremented or decrement by a specified integer value, or the pointer can be left unchanged to access the same element again. Next, at step 955, the pointer is updated using the pointer update step value.

Figure 11:
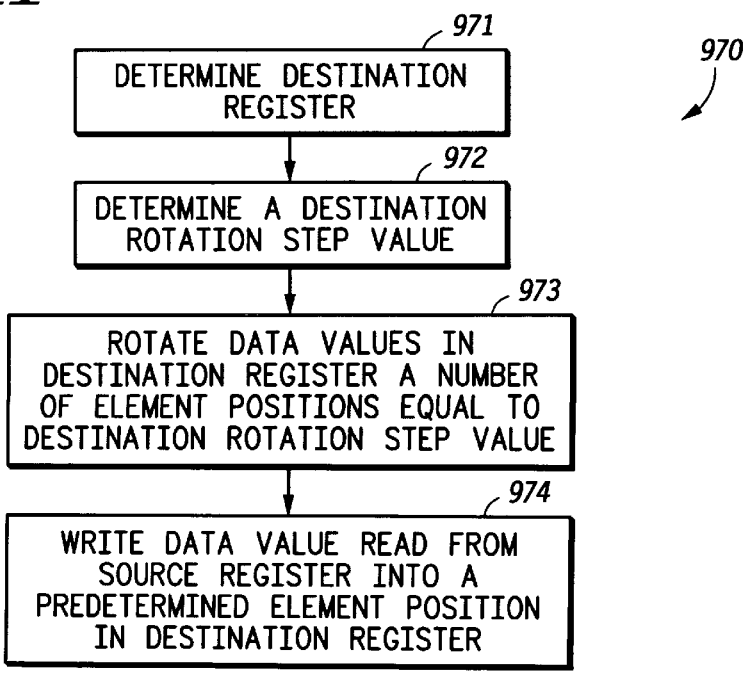
FIG. 11 illustrates an expanded flow of step 970 of FIG. 9.

FIG. 11 illustrates a detailed flow of the step 970 of FIG. 9. At step 971, the destination register is determined as previously discussed with reference to the FIG. 10. Next, at step 972, a destination rotation step value is determined. This value specifies how far to rotate the destination register. Note that the value may be either positive or negative depending upon the direction of the rotation. Next at step 973, the destination register is rotated, or shifted, the number of vector element positions indicated by the destination rotation step value. Note that the destination register can either be rotated or shifted. When rotated, the data values are considered to be wrapped around, while when shifted, there is a final element from where the data is lost once shifted. Next, at step 974, the source element value, read from the selected source element of the source register in step 950, is written into a predetermined element position of the destination register.

The invention put forth provides an efficient manner to provide data to a parallel processor such that each processing element receives new data from a single register location. As such, the invention has been described with reference to specific embodiments. However, one of ordinary skill in the art appreciates that various modifications and changes can be made without departing from the scope of the present invention as set forth in the claims below. For example, while the vector register elements are described to be shifted, there may actually be a separate shifter which reads each element of the vector register, and subsequently writes each element back to the vector register to perform a shifting type function. As a further example, in the system diagram of FIG. 2, the specific architecture of the parallel processing system 3 may be varied, and has been provided for illustrative purposes as one embodiment of the present invention. Accordingly, the specification and figures are to be regarded in an illustrative rather than a restrictive sense, and all such modifications are intended to be included within the scope of present invention. In the claims, means-plus-function clause(s), if any, cover the structures described herein that perform the recited function(s). The mean-plus-function clause(s) also cover structural equivalents and equivalent structures that perform the recited function(s).

We claim:

1. A method for updating vector registers in a parallel processor, the parallel processor having a plurality of vector registers, a sequencer, and the method comprising:

receiving an instruction in the sequencer;

decoding the instruction;

executing the instruction by performing the following steps:

determining a source register from the plurality of vector registers, the source register having a plurality of source element positions each containing an associated source data value;

reading a first source data value from a first source element position in the source register;

determining a destination register from the plurality of vector registers, the destination register having a plurality of destination element positions each containing an associated destination data value;

determining a destination rotation step value;

rotating data values in the destination register through a number of element positions equal to the destination rotation step value; and writing the first source data value into a predetermined element position in the destination register.

2. A method as in claim 1, wherein the parallel processor has a source pointer, the source pointer having a source pointer value, the source pointer value corresponding to the first source element position.

3. A method as in claim 2, the method further comprising the step of:

receiving a pointer update step value as part of the step of decoding the instruction; and adding the pointer update step value to the source pointer value.

4. A method as in claim 3, wherein the pointer update step value is an integer value.

5. A method as in claim 4, wherein the step of adding the pointer update step value utilizes addition modulo "n" where "n" corresponds to a total number of source element positions in the source register.

6. A method as in claim 4, wherein the instruction has an associated mnemonic, "VROTDI".

7. A method as in claim 4, wherein the instruction comprises an op code field, a source register field, and a destination register field.

8. A method as in claim 3, the method further comprising the step of:

receiving the destination rotation step value as part of the step of decoding the instruction.

9. A method as in claim 8, wherein the instruction comprises a destination rotation step value field.

10. A method as in claim 3, wherein a second register stores the destination rotation step value.

11. A method as in claim 2, the method further comprising:

determining a pointer update step value; and adding the pointer update step value to the source pointer value.

12. A method as in claim 11, wherein the pointer update step value is an integer value.

13. A method as in claim 12, wherein a first register stores the pointer update step value.

14. A method as in claim 12, wherein the step of adding the pointer update step value utilizes addition modulo "n" where "n" corresponds to a total number of source element positions in the source register.

15. A method as in claim 12, wherein the instruction has an op code field, a source register field, and a destination register field.

16. A method as in claim 12, the method further comprising the step of:

receiving the destination rotation step value as part of the step of decoding the instruction.

17. A method as in claim 16, wherein the instruction comprises a destination rotation step value field.

18. A method as in claim 12, wherein a third register stores the destination rotation step value.

19. A method as in claim 1, wherein the step of reading the first source data value comprises:

reading a first source data value from a predetermined element position in the source register.

20. A method as in claim 19, the method further comprising the steps of:

determining a source rotation step value; and rotating data values in the source register through a number of element positions equal to the source rotation step value.

21. A method as in claim 20, wherein the source rotation step value is an integer value.

22. A method as in claim 20, the method further comprising the step of:

receiving the destination rotation step value as part of the step of decoding the instruction.

23. A method as in claim 22, wherein the instruction comprises a destination rotation step value field.

24. A method as in claim 20, wherein a fourth register stores the destination rotation step value.

25. A method as in claim 19, the method further comprising the steps of:

determining a source rotation step value; and shifting data values in the source register through a number of element positions equal to the source rotation step value beginning at a shift origin position.

26. A parallel processing system, comprising:

a processing element array having a plurality of processing elements;

a plurality of vector registers having a plurality of element positions, each element position corresponding to one of the plurality of processing elements;

a first vector register update circuitry coupled to the plurality of vector registers, in response to a vector update instruction the first vector register update circuitry selecting a selected source register from the plurality of vector registers, the first vector register update circuitry reading a first data value from the selected source register; and a second vector register update circuitry coupled to the plurality of vector registers and the first vector register update circuitry, the second vector register update circuitry for selecting a selected destination register from the plurality of vector registers, the second vector register update circuitry for determining a first step value, the second vector register update circuitry for rotating data through the selected destination register according to the first step value, the second vector register update circuitry for writing the first data value to the selected destination register.

27. A parallel processing system as in claim 26, wherein the first vector register update circuitry comprises:

a pointer having a pointer value, the pointer value corresponding to a first element position of the plurality of element positions in the selected source register, the first element position storing the first data value; and wherein the first vector register update circuitry determines a pointer update step value and adds the pointer update step value to the pointer value.

28. A parallel processing system as in claim 27, wherein the first and second vector register update circuitries are responsive to a vector update instruction having a mnemonic "VROTDI".

29. A parallel processing system as in claim 27, wherein the pointer update step value is a positive integer, a negative integer, or zero.

30. A parallel processing system as in claim 26, wherein the first vector register update circuitry has a predetermined element position in the selected source register, the first vector register update circuitry shifting a value from the predetermined element position, the first vector register update circuitry determining a source rotation step value and shifting data values in the selected source register a number of times equal to the source rotation step value.

31. A parallel processing system as in claim 30, wherein the source rotation step value is an integer.

32. A parallel data processor, comprising:

a plurality of processing elements;

a first vector register having a first plurality of elements;

a second vector register having a second plurality of elements;

a first decoder circuitry, the first decoder circuitry coupled to the first and second vector registers, the first decoder circuitry coupled to the plurality of processing elements, the first decoder circuitry performing a vector rotate instruction by selecting the first vector register and determining a first element position in the first vector register, the first decoder circuitry shifting a first data value from the first element position, the first decoder circuitry comprising:

a pointer having a pointer value corresponding to the first element position;

a second decoder circuitry coupled to the first and second vector registers, the second decoder circuitry coupled to the first decoder circuitry, the second decoder circuitry selecting the second vector register, the second decoder circuitry determining a rotation value and rotating data in the second vector register according to the rotation value, the second decoder circuitry shifting the first data value from the first element position into a predetermined element position in the second vector register; and wherein the first decoder circuitry determines a pointer step value and adds the pointer step value to the pointer value.

33. A data processing system responsive to a first processor instruction containing a source register field and a destination register field, the data processing system comprising:

an instruction decode circuitry for identifying and decoding the first processor instruction;

a plurality of processing elements;

a first vector register having a first plurality of elements;

a second vector register having a second plurality of elements; and a decoder circuitry, the decoder circuitry coupled to the first and second vector registers, the decoder circuitry coupled to the plurality of processing elements, the decoder circuitry for performing the first processor instruction, the decoder circuitry selecting the first vector register as a source register, the decoder circuitry determining a first window of element positions in the source register using a step pointer, the decoder circuitry selecting the second vector register as a destination register, the decoder circuitry shifting data from the first window of element positions to the destination register, the decoder circuitry selecting a second window of element positions in the source register by updating the step pointer, the decoder circuitry shifting data from the second window of element positions to the destination register.

* * * * *